United States Patent
Tsuzuki et al.

(10) Patent No.: US 9,694,745 B2
(45) Date of Patent: Jul. 4, 2017

(54) VEHICLE APPROACH ALERT DEVICE

(71) Applicant: ANDEN CO., LTD., Anjo, Aichi-pref. (JP)

(72) Inventors: Haruyuki Tsuzuki, Anjo (JP); Chikara Yamamoto, Anjo (JP)

(73) Assignee: ANDEN CO., LTD., Anjo (JP)

( * ) Notice: Subject to any disclaimer, the term of this patent is extended or adjusted under 35 U.S.C. 154(b) by 13 days.

(21) Appl. No.: 14/786,563

(22) PCT Filed: May 16, 2013

(86) PCT No.: PCT/JP2013/003119
§ 371 (c)(1),
(2) Date: Oct. 23, 2015

(87) PCT Pub. No.: WO2014/184827
PCT Pub. Date: Nov. 20, 2014

(65) Prior Publication Data
US 2016/0082882 A1   Mar. 24, 2016

(51) Int. Cl.
*B60Q 5/00* (2006.01)
*G10K 15/02* (2006.01)

(52) U.S. Cl.
CPC ............ *B60Q 5/005* (2013.01); *B60Q 5/008* (2013.01); *G10K 15/02* (2013.01)

(58) Field of Classification Search
CPC ......... B60Q 5/005; B60Q 5/008; G10K 15/02
See application file for complete search history.

(56) References Cited

U.S. PATENT DOCUMENTS 5,129,004 A * 7/1992 Imai .................... G10H 1/0091
381/63
2009/0325700 A1   12/2009 Maeda
(Continued)

FOREIGN PATENT DOCUMENTS

JP   2009-035195 A   2/2009
JP   2013-010465 A   1/2013
(Continued)

OTHER PUBLICATIONS

International Search Report and Written Opinion of the International Searching Authority dated Jul. 2, 2013 issued in the corresponding International application No. PCT/JP2013/003119 (and English translation).
(Continued)

*Primary Examiner* — James Yang
(74) *Attorney, Agent, or Firm* — Posz Law Group, PLC

(57) ABSTRACT

A vehicle approach alert device includes: a first output sound voltage waveform signal generator having a first output sound generator that generates a first signal corresponding to output sound data read out from a memory device, and a first sound volume variable device that controls a voltage level of the first signal; a second output sound voltage waveform signal generator having a second output sound generator that generates a second signal corresponding to the output sound data read out from the memory device, and a second sound volume variable device that controls a voltage level of the second signal; a mixer circuit that mixes the first signal and the second signal; and an amplifier that outputs a vehicle approach alert sound with flowing current, which corresponds to a voltage of a mixed signal, through a sound output body.

8 Claims, 2 Drawing Sheets

(56) References Cited

U.S. PATENT DOCUMENTS

2010/0166210 A1* 7/2010 Isozaki .................... B60L 3/00
  381/86
2011/0010269 A1* 1/2011 Ballard ................. B60Q 5/008
  705/26.41

FOREIGN PATENT DOCUMENTS

| WO | 2013/035167 A1 | 3/2013 |
| WO | 2014/184828 A1 | 11/2014 |
| WO | 2014/184829 A1 | 11/2014 |

OTHER PUBLICATIONS

Office Action dated Oct. 27, 2014 issued in corresponding JP patent application No. 2011-275998 (and English translation).

* cited by examiner

VEHICLE APPROACH ALERT DEVICE

CROSS REFERENCE TO RELATED APPLICATION

This application is a U.S. national stage of International Application No. PCT/JP2013/003119 filed on May 16, 2013 and is based on Japanese Patent Application No. 2011-275998 filed on Dec. 16, 2011, the disclosures of which are incorporated herein by reference.

TECHNICAL FIELD

The present disclosure relates to a vehicle approach alert device for alerting in a surrounding area by outputting a sound from a vehicle that the vehicle approaches.

BACKGROUND ART

Recently, an electric vehicle (i.e., EV) and a hybrid vehicle (i.e., HV) have a structure for generating a small noise. Thus, it is difficult for a pedestrian to find these vehicles approaching the pedestrian. In order to increase a recognition degree of the vehicle disposed near and around the pedestrian or the like, the vehicle approach alert device for generating artificial engine sound is mounted on these vehicles (see, for example, Patent Literature 1). In the vehicle approach alert device, a method for outputting sound is a method for outputting the sound by setting a coded data, which is prepared by converting and coding the output sound data such as PCM data (i.e., pulse code modulation data) stored in a memory of a microcomputer, i.e., converting and coding the magnitude of the sound to a data code, into a D/A converter and a PWM output device. An output of the oscillating driving sound by the vehicle approach alert device is performed when a road noise is small and the vehicle speed is low.

The output sound data mainly indicates a pseudo travelling sound such as a pseudo engine sound and a pseudo motor sound. The data is stored in the memory as data for a predetermined time interval. The vehicle approach alert device outputs the data for the predetermined time interval repeatedly, so that the device outputs the approach alert sound. The output sound data presents a chord sound prepared by synthesizing multiple frequency components. The chord sound includes "fluctuation (i.e., envelope)" of sound indicated as a curve drawn by peaks of the sound or the electric waveform, i.e., "harmonization and intonation of vibrato" for increasing and decreasing a sound volume with time, so that a pedestrian easily notices approach of the vehicle through the chord sound.

However, since the output sound data is presented by adding the "fluctuation," the amount of time for the output sound data to be stored, i.e., the length of time for the output sound data increases, and therefore, the memory capacity increases. Further, the memory capacity of the microcomputer limits the time interval, and therefore, it is not sufficient to add the "fluctuation" of sound such as "harmonization and intonation of vibrato" to be output.

Furthermore, even if the "fluctuation" is added into the output sound data, the way of hearing the approach alert sound by the pedestrian may be changed according to a mounting place of the vehicle approach alert device on the vehicle and a sound isolation property of the vehicle.

PRIOR ART LITERATURES

Patent Literature

Patent Literature 1: JP-2009-35195 A

SUMMARY OF INVENTION

It is an object of the present disclosure to provide a vehicle approach alert sound device, in which a "fluctuation" of an approach alert sound is controllable, based on output sound data having a small data amount, to be optimum for a vehicle according to various conditions.

According to an example aspect of the present disclosure, a vehicle approach alert device includes: a first output sound voltage waveform signal generator having: a first output sound generator that reads out an output sound data from a memory device, for storing the output sound data of an approach alert sound of a vehicle, with a pitch corresponding to a carrier frequency, and generates a first approach alert sound voltage waveform signal corresponding to the output sound data; and a first sound volume variable device that adjusts a sound volume by controlling a voltage level of the first approach alert sound voltage waveform signal generated by the first output sound generator; a second output sound voltage waveform signal generator having: a second output sound generator that reads out the output sound data from the memory device with the pitch corresponding to the carrier frequency, and generates a second approach alert sound voltage waveform signal corresponding to the output sound data; and a second sound volume variable device that adjusts the sound volume by controlling a voltage level of the second approach alert sound voltage waveform signal generated by the second output sound generator; a mixer circuit that mixes the first approach alert sound voltage waveform signal, of which the voltage level is controlled, and the second approach alert sound voltage waveform signal, of which the voltage level is controlled; and an amplifier that outputs a vehicle approach alert sound from a sound output body mounted on the vehicle with flowing current, which corresponds to a voltage of a mixed approach alert sound voltage waveform signal, through the sound output body.

Although the above vehicle approach alert device has a simple construction such that the first and the second output sound voltage waveform signal generators have the first and the second output sound generators and the first and the second sound volume variable devices, respectively, the vehicle approach alert device adds various "fluctuations" to the approach alert sound by controlling the approach alert sound voltage waveform signal. Accordingly, by storing only the output sound data having the small data amount, to which the "fluctuation (i.e., the envelope)" is not added, in the memory device, the "fluctuation" is sufficiently added. Thus, the vehicle approach alert sound device can control the "fluctuation" of the approach alert sound to be optimum for the vehicle in accordance with various situations, based on the output sound data having the small data amount.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

First Embodiment

Figure 1:
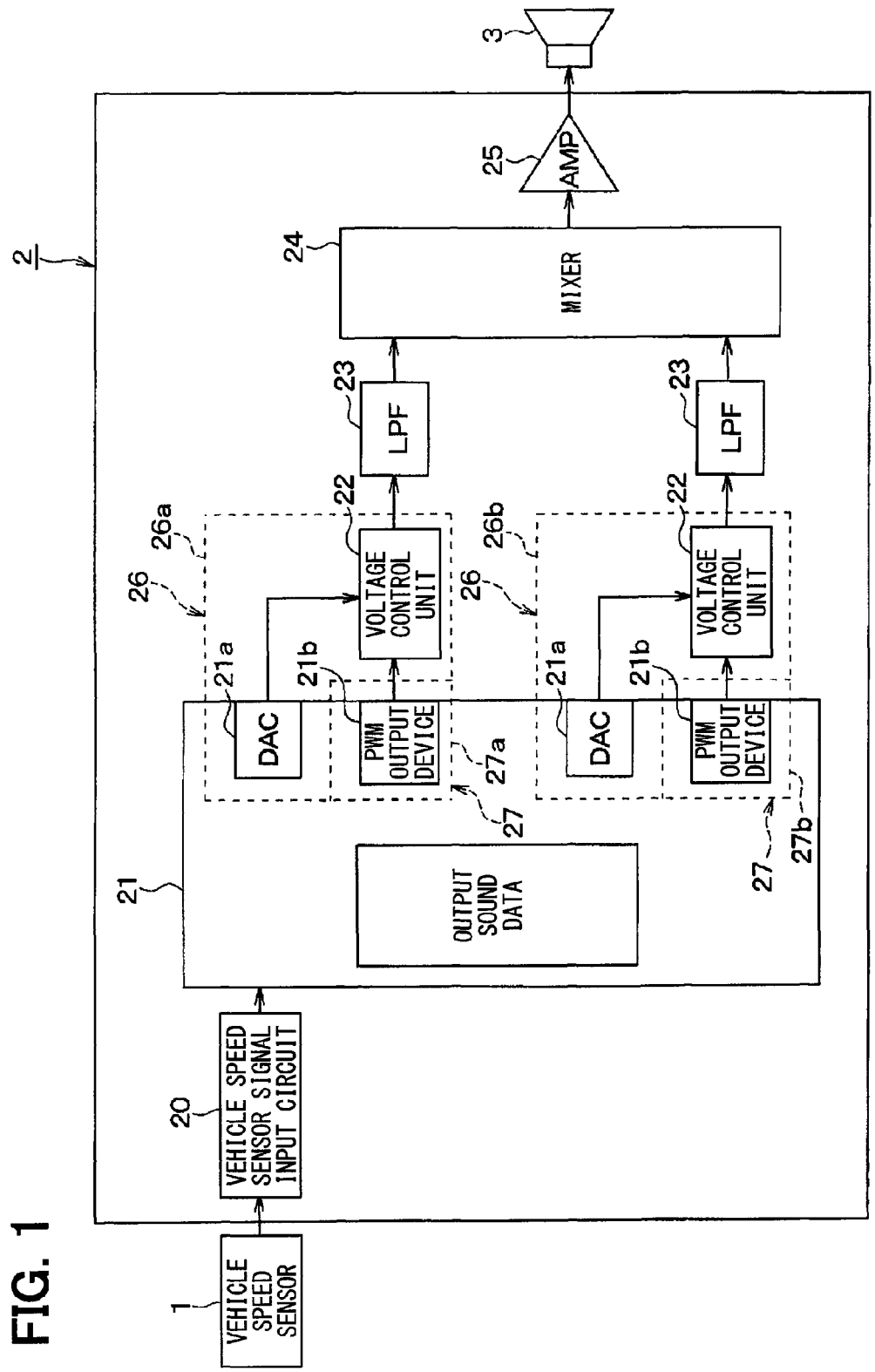
FIG. 1 is a circuit block diagram showing a vehicle approach alert system including a vehicle approach alert device according to a first embodiment.
Figure 2:
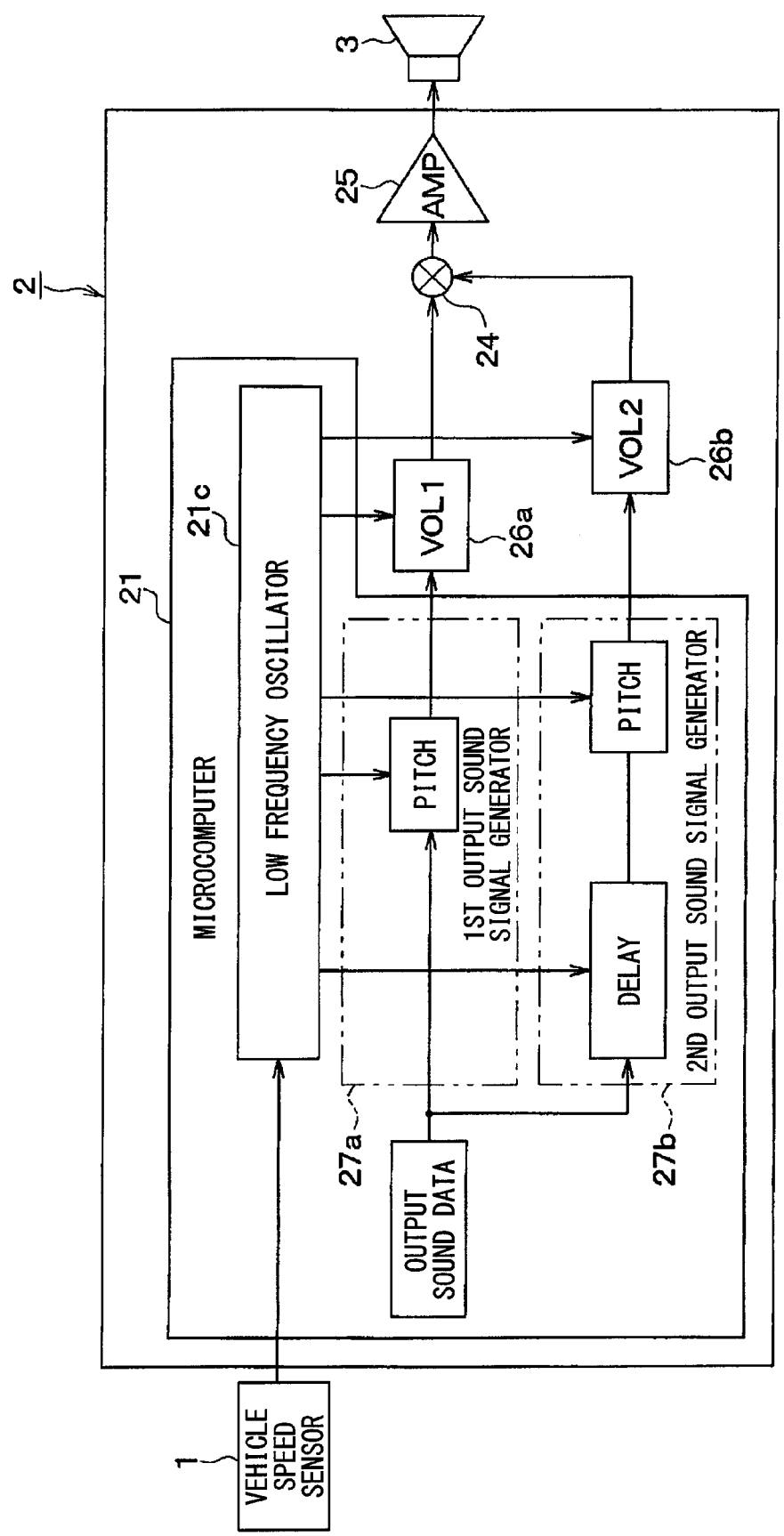
FIG. 2 is a functional block diagram showing functions of the vehicle approach alert system shown in FIG. 1.

FIG. 1 is a circuit block diagram showing a vehicle approach alert system including a vehicle approach alert device according to a present embodiment. FIG. 2 is a functional block diagram showing functions of the vehicle approach alert system shown in FIG. 1. With reference to these drawings, the vehicle approach alert system including the vehicle approach alert device according to the present embodiment will be explained.

As shown in FIG. 1, the vehicle approach alert system includes a vehicle speed sensor 1, the vehicle approach alert device 2 and the speaker 3. In the vehicle approach alert system, the vehicle approach alert device 2 outputs an approach alert sound such as a pseudo engine sound or a pseudo motor sound from the speaker 3 as a sound generator based on a vehicle speed sensor signal transmitted from the vehicle speed sensor 1 when the vehicle travels with a low speed (e.g., equal to or smaller than 20 km/h) and a low road noise, so that the vehicle approach alert device 2 alerts a pedestrian or the like around the vehicle that the vehicle approaches. Here, the vehicle approach alert device 2 is separated from the speaker 3. Alternatively, the vehicle approach alert device 2 and the speaker 3 may be integrated into one body.

The vehicle speed sensor 1 outputs the vehicle speed sensor signal as a driving condition detection signal of the vehicle. The vehicle approach alert device 2 receives the vehicle speed sensor signal from the vehicle speed sensor 1 so as to obtain the vehicle speed. Further, the device 2 controls the output sound according to the vehicle speed when the vehicle travels with a low speed. Here, the sound is output according to the vehicle speed. Alternatively, the device 2 may control the output sound according to a sensor for generating a sensor signal corresponding to a driving condition of the vehicle, for example, an acceleration opening degree indicated by a sensor signal of an acceleration opening degree sensor for showing the acceleration opening degree. Alternatively, using a microphone, an ambient noise degree indicative of a degree of the ambient noise is detected, so that the device 2 may control the output sound according to the noise degree.

The vehicle approach alert device 2 includes a vehicle speed sensor signal input circuit 20, a microcomputer 21, a voltage control unit 22, a low pass filter (i.e., LPF) 23, a mixer circuit 24 and a power amplifier (i.e., AMP) 25.

The vehicle speed sensor signal input circuit 20 is a unit for inputting a vehicle speed sensor signal output from the above described vehicle speed sensor 1, and the circuit 20 transmits the sensor signal to the microcomputer 21.

The microcomputer 21 includes a memory corresponding to a memory device not shown and a processing device. Further, the microcomputer 21 includes two sets of a DAC 21a and a PWM output device 21b. The microcomputer 21 generates two approach alert sound voltage waveform signals as an output of sound according to an output from each of two sets of the DAC 21a and the PWM output device 21b using the voltage control unit 22, which is equipped in each of two sets. The DAC 21a and the voltage control unit 22 provide a sound volume variable device 26 (26a, 26b), and the PWM output device 21b provides an output sound signal generator 27 (27a, 27b). Two sets of the DAC 21a, the PWM output device 21b and the voltage control unit 22 provide the first and the second output sound voltage waveform signal generators for generating the approach alert sound voltage waveform signal as the output sound of each set.

The memory of the microcomputer 21 stores the control program for outputting the sound and the output sound data such as the PCM data indicative of the pseudo driving sound such as the pseudo engine sound and the pseudo motor sound. Further, the memory stores the envelope frequency, the carrier frequency and the data for setting the sound volume (i.e., a sound pressure level). For example, the microcomputer 21 stores the table of an envelope frequency corresponding to the driving condition of the vehicle such as a vehicle speed and an acceleration opening degree, and a table for a carrier frequency and a delay time corresponding to the envelope frequency, in the memory. Using these tables stored in the memory, the microcomputer 21 calculates the envelope frequency corresponding to the driving condition such as the vehicle speed and the acceleration opening degree when the vehicle runs with a low speed. Further, the microcomputer 21 calculates the sound volume and the carrier frequency or the delay time corresponding to the envelope frequency.

The microcomputer 21 reads out the output sound data at each sampling time corresponding to the predetermined carrier frequency with considering the delay time from each of the first and the second output sound voltage waveform signal generators, and sets the data in each PWM output device 21b, so that the PWM output device 21b outputs the approach alert sound voltage waveform signal corresponding to the output sound data to be output. In this case, the approach alert sound voltage waveform signal is a signal before being variable in the sound volume. Further, the DAC 21a generates the control signal for varying the sound volume of the output sound corresponding to the envelope frequency, which is independent from the approach alert sound voltage waveform signal of the PWM output device 21b.

The voltage control unit 22 is arranged to correspond to the DAC 21a and the PWM output device 21b of each set. Based on the control signal transmitted from the DAC 21a, the unit 22 changes the voltage level of the approach alert sound voltage waveform signal of the PWM output device 21b. Specifically, the unit 22 changes the voltage level of the approach alert sound voltage waveform signal of the PWM output device 21b to be the voltage level indicated by the control signal. Accordingly, for example, as the sound pressure level of the output sound becomes small, the voltage level of the approach alert sound voltage waveform signal is reduced. Then, the signal is output from the voltage control unit 22.

When the DAC 21a, the PWM output device 21b and the voltage control unit 22 are shown as a functional block, for example, the functional block is provided by FIG. 2. Specifically, the PWM output device 21b functions as the output sound signal generator 27a, 27b for reading out the output sound data at a predetermined pitch using the oscillating signal generated as the clock signal from the low frequency oscillator 21c mounted in the microcomputer 21. One of them, i.e., the first output sound signal generator 27a reads out the output sound data at the predetermined pitch without delay time, and the other of them, i.e., the second output sound signal generator 27b reads out the output sound data at the predetermined pitch with the delay time with respect to the data at the beginning of the reading out of the output sound data by the first output sound signal generator 27a. The DAC 21a and the voltage control unit 22 function as the first and the second sound volume variable devices 26a, 26b for adjusting the sound volume (i.e., VOL) of the output sound by changing the voltage level of the approach alert sound voltage waveform signal output from each of the first and the second output sound signal generators 27a, 27b, respectively.

The LPF 23 corresponds to a filter device, and is arranged at each voltage control unit 22. The LPF 23 removes a noise component having the high frequency so that the LPF 23 generates an output corresponding to the output from the PWM output device 21b transmitted via the voltage control unit 22. For example, the LPF 23 storages the voltage corresponding to the output of the voltage control unit 22, in an built-in capacitor, and then, the LPF 23 outputs the voltage to amplifier 25 via the mixer circuit 24.

The mixer circuit 24 mixes the output of each LPF 23. Specifically, the mixer circuit 24 generates the output having a voltage waveform prepared by synthesizing two approach alert sound voltage waveform signals, which the noise component is removed from. Thus, the circuit 24 applies the output to the amplifier 25.

The amplifier 25 flows the current, which corresponds to the output of the LPF 23, through the speaker 3 according to the applied voltage from a constant voltage power source not shown. The sound pressure of the output sound from the speaker 3 is determined by the magnitude (i.e., the amplitude) of the current, which is supplied from the amplifier 25. The magnitude of the current supplied from the amplifier 25 is determined by the output waveform of the LPF 23 corresponding to the PWM output. Accordingly, the current to be flown by the amplifier 25 is changed according to the adjustment of the voltage level of the voltage control unit 22.

According to the above construction, the vehicle approach alert system including the vehicle approach alert device according to the present embodiment is prepared.

Then, a method for attaining the "fluctuation" when the vehicle approach alert system having the above construction outputs the sound will be explained. Here, an example of a method for attaining the "fluctuation" when the vehicle approach alert system outputs the sound will be explained. The described example is merely one of examples. The "fluctuation" may be attained by other various methods than the below described method such as by using alone the output sound voltage waveform signal generated by each of the first and the second output sound voltage waveform signal generators and by mixing each signal. Here, the method for attaining the "fluctuation" at the sound output will be explained using a functional block diagram shown in FIG. 2.

In the vehicle approach alert system according to the present embodiment, the first and the second sound volume variable devices 26a, 26b set the sound volume setting value, i.e., the voltage level of the approach alert sound voltage waveform signal output from the first and the second output sound signal generators 27a.27b, respectively, so that the sound volume of the output sound is adjusted. Further, the second output sound signal generator 27b adjusts the delay time of the approach alert sound voltage waveform signal generated by the second output sound voltage waveform signal generator, and the generator 27b changes the phase of the approach alert sound voltage waveform signal output from each of the first and the second output sound voltage waveform signal generators. Further, the reading pitch of the output sound data in the first and the second output sound signal generators 27a, 27b is controlled, so that the reading pitches of the generators 27a, 27b are set to be the same pitch or different pitches. Thus, the frequency of each approach alert sound voltage waveform signal output from the first and the second output sound signal generators 27a, 27b may be changed. Based on these operations, each attaining method described below is performed, so that the "fluctuation" at the sound output is realized.

(1) An Attaining Method of the Fluctuation Using a Variable Sound Volume

By varying the sound volume, the "fluctuation" is added to the approach alert sound to be output. For example, the first sound volume variable device 26a controls the sound volume setting value (i.e., the voltage level) with respect to the approach alert sound voltage waveform signal output from the first output sound signal generator 27a according to the envelope frequency calculated based on the vehicle sensor signal. Thus, as the vehicle speed becomes large, the envelope frequency increases, and the sound volume is turned up and down according to the envelope frequency. The "fluctuation (i.e., the envelope)" caused by the variable sound volume is added to the approach alert sound to be output. In this case, the second output sound signal generator 27b does not output the approach alert sound voltage waveform signal.

Thus, the voltage based on the approach alert sound voltage waveform signal output from the first output sound signal generator 27a via the mixer circuit 24 is applied to the amplifier 25. Since the voltage level of the approach alert sound voltage waveform signal output from the first output sound signal generator 27a is turned up and down according to the envelope frequency, the "fluctuation caused by the change of the sound volume (i.e., tremolo effect)" is added. Thus, it is possible to realize the "fluctuation" effect caused by the sound volume change.

Here, the envelope frequency is calculated according to the vehicle speed, and the sound volume setting value is controlled according to the envelope frequency. Alternatively, the envelope frequency may be calculated based on the driving condition other than the vehicle speed such as the acceleration opening degree such that the envelope frequency increases as the acceleration opening degree becomes large. Alternatively, the envelope frequency may be calculated based on an environmental noise degree indicative of the degree of noise around the vehicle such that the envelope frequency increases as the environmental noise degree becomes large. Alternatively, the envelope frequency may be calculated based on one of, a part of or all of the vehicle speed, the acceleration opening degree and the environmental noise degree.

(2) An Attaining Method of the Fluctuation Using a Variable Carrier Frequency (i.e., a Variable Pitch)

By varying the carrier frequency, i.e., the reading frequency (i.e., the pitch) of the output sound data, the "fluctuation" may be added to the approach alert sound to be output. For example, the carrier frequency (i.e., the pitch) for reading out the output sound data at the first output sound signal generator 27a with respect to the approach alert sound voltage waveform signal output from the first output sound signal generator 27a is controlled according to the envelope frequency calculated from the vehicle speed sensor signal. Specifically, the envelope frequency increases as the vehicle speed becomes large, and further, the carrier frequency corresponding to the envelope frequency increases, so that the pitch (i.e., the sampling cycle) is shortened. Thus, the reading pitch is controlled according to the carrier frequency, so that the "fluctuation" caused by the frequency change is added to the approach alert sound to be output. In this case, the second output sound signal generator 27b does not output the approach alert sound voltage waveform signal.

Thus, the voltage prepared based on only the approach alert sound voltage waveform signal output from the first output sound signal generator 27a via the mixer circuit 24 is applied to the amplifier 25. Since the frequency of the approach alert sound voltage waveform signal output from the first output sound signal generator 27a is controlled, the "fluctuation caused by the frequency change" is added. Thus, it is possible to obtain the effect of the "fluctuation" caused by the variable frequency.

Here, the envelope frequency is calculated according to the vehicle speed, and the carrier frequency (i.e., the pitch) for reading out the output sound data is adjusted according to the envelope frequency. Alternatively, the envelope frequency may be calculated based on the driving condition other than the vehicle speed such as the acceleration opening degree such that the envelope frequency increases as the acceleration opening degree becomes large, and the carrier frequency (i.e., the pitch) corresponding to the envelope frequency may be calculated. Alternatively, the envelope frequency may be calculated based on an environmental noise degree indicative of the degree of noise around the vehicle in addition to the driving condition such that the envelope frequency increases as the environmental noise degree becomes large. Alternatively, the envelope frequency may be calculated based on one of, a part of or all of the vehicle speed, the acceleration opening degree and the environmental noise degree.

(3) An Attaining Method of the Fluctuation Using a Long Delay

The first output sound signal generator 27a generates the approach alert sound voltage waveform signal by reading out the output sound data in turn at a pitch corresponding to the carrier frequency. Further, the second output sound signal generator 27b generates the approach alert sound voltage waveform signal by reading out and outputting the output sound data at a pitch corresponding to the carrier frequency with delaying a predetermined delay time to be required. For example, the approach alert sound voltage waveform signal is generated by reading out and outputting the output sound data in a certain address, which is prepared by adding an address counter corresponding to the delay time. The delay time may be set according to the "fluctuation" to be required. For example, the delay time is, for example, in a range between 20 milliseconds (corresponding to 50 Hz) and 300 milliseconds (corresponding to 3.3 Hz).

The mixer circuit 24 mixes the approach alert sound voltage waveform signals output from the first and the second output sound signal generators 27a, 27b, and then, outputs a mixed signal. Thus, the "fluctuation caused by the long delay" is added. The effect of the "fluctuation" caused by the long delay, i.e., the effect of the "fluctuation," in which an echo is produced based on the setting value of the delay time for the long delay, is realized since, for example, the echo corresponding to the long delay is produced, and the producing time of the echo is changed in accordance with the delay time.

Here, the sound volume and the frequency are not explained. However, these are varied by a manner explained in (1) the attaining method of the fluctuation using a variable sound volume and (2) the attaining method of the fluctuation using a variable frequency.

(4) An Attaining Method of the Fluctuation Using a Short Delay

Similar to a case of the long delay, the first output sound signal generator 27a generates the approach alert sound voltage waveform signal by reading out and outputting the output sound data in turn at a pitch corresponding to the carrier frequency. Further, the second output sound signal generator 27b generates the approach alert sound voltage waveform signal by reading out and outputting the output sound data at a pitch corresponding to the carrier frequency with delaying a predetermined delay time to be required. For example, the approach alert sound voltage waveform signal is generated by reading out and outputting the output sound data in a certain address, which is prepared by adding an address counter corresponding to the delay time. The delay time may be set according to the "fluctuation" to be required. For example, the delay time is in a range between 0.5 milliseconds (corresponding to 2 kHz) and 20 microseconds (corresponding to 50 Hz).

The mixer circuit 24 mixes the approach alert sound voltage waveform signals output from the first and the second output sound signal generators 27a, 27b, and then, outputs a mixed signal. Thus, the "fluctuation caused by the short delay (i.e., flanger effect)" is added. The effect of the "fluctuation" caused by the short delay, i.e., the effect of the "fluctuation" is realized that the fluctuation is disposed at a boundary between whether the fluctuation is identified as a synthesized sound by an ear of a human, and whether the fluctuation is identified as an echo.

Here, the sound volume and the variable frequency are not explained. However, these are varied by a manner explained in (1) the attaining method of the fluctuation using a variable sound volume and (2) the attaining method of the fluctuation using a variable frequency.

(5) An Attaining Method of the Fluctuation Using a Combination of the Delay and the Frequency (i.e., the Pitch) Change The effect of the "fluctuation" may be obtained by a combination of (3) or (4) the attaining method of the fluctuation using a short delay or a long delay and (2) the attaining method of the fluctuation using a variable frequency. For example, the delay time is changed according to the carrier frequency corresponding to the envelope frequency, which is calculated based on the vehicle speed sensor signal. Alternatively, the variable range and variable speed of the delay time may be adjusted according to the carrier frequency.

Thus, the delay time may be changed according to the carrier frequency. In this case, the mixer circuit 24 mixes the approach alert sound voltage waveform signals output from the first and the second output sound signal generators 27a, 27b, and then, outputs a mixed signal. Thus, the "fluctuation (i.e., jet effect)" caused by setting the delay time in accordance with the carrier frequency is added. The effect of the "fluctuation" caused by setting the delay time in accordance with the carrier frequency is obtained.

As described above, using a simple construction such that the first and the second output sound voltage waveform signal generators have the first and the second output sound signal generators 27a, 27b and the first and the second sound volume variable devices 26a, 26b, i.e., using the simple circuit construction with the microcomputer 21, the various "fluctuation" caused by the sound volume change, the carrier frequency (i.e., pitch) change, the long delay, the short delay, or a combination of the delay and the carrier frequency (i.e., pitch) change with controlling the approach alert sound voltage waveform signal output from the microcomputer 21 is added to the approach alert sound. Accordingly, only the output sound data having a small data amount, in which the "fluctuation (i.e., envelope)" is not added, is stored in the memory, so that the "harmonization and intonation of vibrato," i.e., the "fluctuation" is sufficiently added.

Thus, a pedestrian easily notices approach of the vehicle through the sound. Further, even if the way of hearing the approach alert sound by the pedestrian is changed according to a mounting place of the vehicle approach alert device on the vehicle and a sound isolation property of the vehicle, the "fluctuation" of the approach alert sound is controlled by the program of the microcomputer 21, so that the "fluctuation" is controlled to be optimum for the vehicle. Accordingly, the vehicle approach alert sound device can control the "fluctuation" of the approach alert sound using the output sound data having the small data amount to be optimized for the vehicle according to various conditions.

Other Embodiments

In the above embodiment, the microcomputer 21 outputs the control signal using the DAC 21a, and performs the voltage control of the voltage control unit 22 by generating the control signal, for changing the sound pressure, from the DAC 21a. Alternatively, the voltage control of the voltage control unit 22 may be performed using the PWM control device. When the PWM control device is used, and the voltage level of the output waveform of the output sound is changed according to the temporal variation of a value indicative of the driving condition such as the vehicle speed and the acceleration opening degree, the duty ratio of the PWM output between on-state and the off state may be changed and further the sampling cycle of the PWM output may be also changed according to the vehicle speed and the acceleration opening degree.

The present disclosure has the following aspects.

According to an aspect of the present disclosure, a vehicle approach alert device includes: a first output sound voltage waveform signal generator having: a first output sound generator that reads out an output sound data from a memory device, for storing the output sound data of an approach alert sound of a vehicle, with a pitch corresponding to a carrier frequency, and generates a first approach alert sound voltage waveform signal corresponding to the output sound data; and a first sound volume variable device that adjusts a sound volume by controlling a voltage level of the first approach alert sound voltage waveform signal generated by the first output sound generator; a second output sound voltage waveform signal generator having: a second output sound generator that reads out the output sound data from the memory device with the pitch corresponding to the carrier frequency, and generates a second approach alert sound voltage waveform signal corresponding to the output sound data; and a second sound volume variable device that adjusts the sound volume by controlling a voltage level of the second approach alert sound voltage waveform signal generated by the second output sound generator; a mixer circuit that mixes the first approach alert sound voltage waveform signal, of which the voltage level is controlled, and the second approach alert sound voltage waveform signal, of which the voltage level is controlled; and an amplifier that outputs a vehicle approach alert sound from a sound output body mounted on the vehicle with flowing current, which corresponds to a voltage of a mixed approach alert sound voltage waveform signal, through the sound output body.

Although the above vehicle approach alert device has a simple construction such that the first and the second output sound voltage waveform signal generators have the first and the second output sound generators and the first and the second sound volume variable devices, respectively, the vehicle approach alert device adds various "fluctuations" to the approach alert sound by controlling the approach alert sound voltage waveform signal. Accordingly, by storing only the output sound data having the small data amount, to which the "fluctuation (i.e., the envelope)" is not added, in the memory device, the "fluctuation" is sufficiently added. Thus, the vehicle approach alert sound device can control the "fluctuation" of the approach alert sound to be optimum for the vehicle in accordance with various situations, based on the output sound data having the small data amount.

Alternatively, the vehicle approach alert device may further includes: a sensor signal input circuit that inputs a sensor signal from a sensor, which generates the sensor signal corresponding to a driving condition of the vehicle. The first output sound voltage waveform signal generator calculates an envelope frequency of the vehicle approach alert sound based on the sensor signal input through the sensor signal input circuit, sets a sound volume setting value in the first sound volume variable device according to the envelope frequency, and adds a fluctuation, caused by a sound volume change, into the vehicle approach alert sound with controlling the voltage level of the first approach alert sound voltage waveform signal to turn up and down the sound volume of the vehicle approach alert sound according to the envelope frequency. In this case, by turning up and down the voltage level of the approach alert sound voltage waveform signal output from the first output sound signal generator according to the envelope frequency, the "fluctuation caused by the sound volume change (i.e., tremolo effect)" is added. Thus, the effect of the "fluctuation" caused by the output sound change is realized.

Alternatively, the vehicle approach alert device may further include: a sensor signal input circuit that inputs a sensor signal from a sensor, which generates the sensor signal corresponding to a driving condition of the vehicle. The first output sound voltage waveform signal generator calculates an envelope frequency of the vehicle approach alert sound based on the sensor signal input through the sensor signal input circuit, sets the carrier frequency according to the envelope frequency, and adds a fluctuation, caused by a carrier frequency change, into the vehicle approach alert sound by reading out the output sound data at the first output sound generator with the pitch corresponding to a set carrier frequency. In this case, by controlling the frequency of the approach alert sound voltage waveform signal output from the first output sound signal generator, the "fluctuation caused by the frequency change" is added. Thus, the effect of the "fluctuation" caused by the frequency change is realized.

Alternatively, the second output sound voltage waveform signal generator may read out the output sound data from the memory device with setting a predetermined delay time with respect to a start-reading data of the output sound data at the first output sound generator. In this case, by setting the predetermined delay time when the output sound data is read out at the second output sound voltage waveform signal generator, the "fluctuation" is added to the approach alert sound.

The delay time may be set to be in a range between 20 milliseconds and 300 milliseconds. The mixer circuit mixes the first approach alert voltage waveform signal, of which the voltage level is controlled, and the second approach alert sound voltage waveform signal, of which the voltage level is controlled, so as to add a fluctuation caused by a long delay into the vehicle approach alert sound. In this case, the effect of the "fluctuation" caused by the long delay, i.e., the effect of the "fluctuation," in which an echo is produced based on the setting value of the delay time for the long delay, is realized since, for example, the echo corresponding to the long delay is produced, and the producing time of the echo is changed in accordance with the delay time.

Alternatively, the delay time may be set to be in a range between 0.5 milliseconds and 20 milliseconds. The mixer circuit mixes the first approach alert voltage waveform signal, of which the voltage level is controlled, and the second approach alert sound voltage waveform signal, of which the voltage level is controlled, so as to add a fluctuation caused by a short delay into the vehicle approach alert sound. In this case, the effect of the "fluctuation" caused by the short delay, i.e., the effect of the "fluctuation" is realized that the fluctuation is disposed at a boundary between whether the fluctuation is identified as a synthesized sound by an ear of a human, and whether the fluctuation is identified as an echo.

Alternatively, the vehicle approach alert device may further include: a sensor signal input circuit that inputs a sensor signal from a sensor, which generates the sensor signal corresponding to a driving condition of the vehicle. The second output sound voltage waveform signal generator calculates an envelope frequency of the approach alert sound based on the sensor signal input through the sensor signal input circuit, and sets the delay time according to the envelope frequency. In this case, the "fluctuation (i.e., jet effect)" caused by setting the delay time in accordance with the carrier frequency is added. Thus, the effect of the "fluctuation" caused by setting the delay time in accordance with the carrier frequency is obtained.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A vehicle approach alert device comprising:
   a first output sound voltage waveform signal generator including:
      a first output sound generator that reads out an output sound data from a memory device, for storing the output sound data of an approach alert sound of a vehicle, with a pitch corresponding to a carrier frequency, and generates a first approach alert sound voltage waveform signal corresponding to the output sound data, and
      a first sound volume variable device that adjusts a sound volume by controlling a voltage level of the first approach alert sound voltage waveform signal generated by the first output sound generator;
   a second output sound voltage waveform signal generator including:
      a second output sound generator that reads out the output sound data from the memory device with the pitch corresponding to the carrier frequency, and generates a second approach alert sound voltage waveform signal corresponding to the output sound data, and
      a second sound volume variable device that adjusts the sound volume by controlling a voltage level of the second approach alert sound voltage waveform signal generated by the second output sound generator;
   a sensor signal input circuit that inputs a sensor signal from a sensor, which generates the sensor signal corresponding to a driving condition of the vehicle;
   a mixer circuit that combines the first approach alert sound voltage waveform signal, of which the voltage level is controlled, and the second approach alert sound voltage waveform signal, of which the voltage level is controlled to produce a mixed approach alert sound voltage waveform; and
   an amplifier that outputs a vehicle approach alert sound from a sound output body mounted on the vehicle with flowing current, which corresponds to a voltage of the mixed approach alert sound voltage waveform signal, through the sound output body, wherein
   the first output sound voltage waveform signal generator calculates an envelope frequency of the vehicle approach alert sound based on the sensor signal input through the sensor signal input circuit, sets a sound volume setting value in the first sound volume variable device according to the envelope frequency, and adds a fluctuation, caused by a sound volume change, into the vehicle approach alert sound with controlling the voltage level of the first approach alert sound voltage waveform signal to turn up and down the sound volume of the vehicle approach alert sound according to the envelope frequency, and
   the envelope frequency is a frequency of a control signal that varies the first approach alert sound of the first output sound generator in the mixed approach alert sound voltage waveform output from the mixer circuit according to the driving condition of the vehicle.

2. The vehicle approach alert device according to claim 1, wherein:
   the first output sound voltage waveform signal generator calculates an envelope frequency of the vehicle approach alert sound based on the sensor signal input through the sensor signal input circuit, sets the carrier frequency according to the envelope frequency, and adds a fluctuation, caused by a carrier frequency change, into the vehicle approach alert sound by reading out the output sound data at the first output sound generator with the pitch corresponding to a set carrier frequency.

3. The vehicle approach alert device according to claim 1, wherein:
   the second output sound voltage waveform signal generator reads out the output sound data from the memory device with setting a predetermined delay time with respect to a start-reading data of the output sound data at the first output sound generator.

4. The vehicle approach alert device according to claim 3, wherein:
   the delay time is set to be in a range between 20 milliseconds and 300 milliseconds; and
   the mixer circuit mixes the first approach alert voltage waveform signal, of which the voltage level is controlled, and the second approach alert sound voltage waveform signal, of which the voltage level is controlled, so as to add a fluctuation caused by a long delay into the vehicle approach alert sound.

5. The vehicle approach alert device according to claim 3, wherein:

the delay time is set to be in a range between 0.5 milliseconds and 20 milliseconds; and the mixer circuit combines the first approach alert voltage waveform signal, of which the voltage level is controlled, and the second approach alert sound voltage waveform signal, of which the voltage level is controlled, so as to add a fluctuation caused by a short delay into the vehicle approach alert sound.

6. The vehicle approach alert device according to claim 3, wherein:

the second output sound voltage waveform signal generator calculates an envelope frequency of the approach alert sound based on the sensor signal input through the sensor signal input circuit, and sets the delay time according to the envelope frequency.

7. The vehicle approach alert device according to claim 1, wherein the fluctuation added by the envelope frequency of the control signal includes a harmonization and an intonation of vibrato.

8. The vehicle approach alert device according to claim 1, wherein the memory device is stored in a microcomputer.

* * * * *